Patented Dec. 12, 1922.

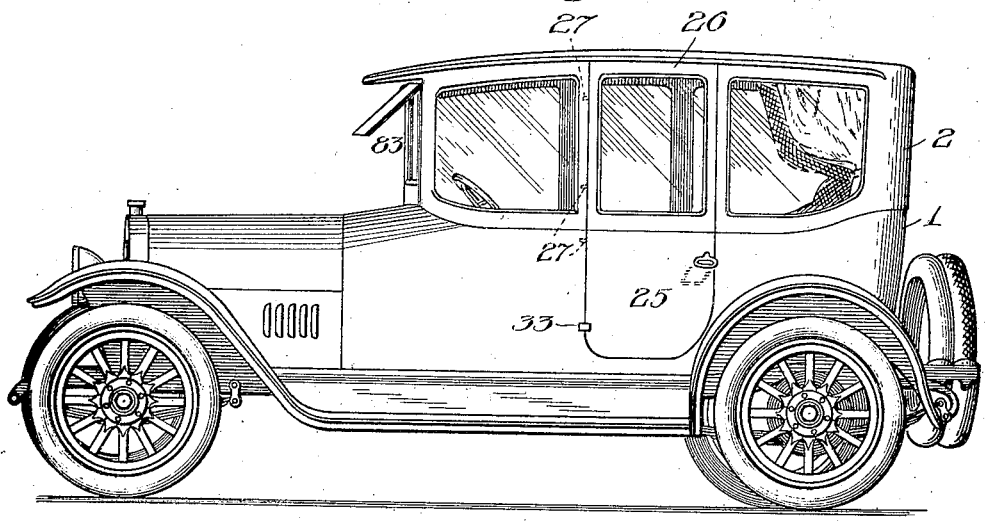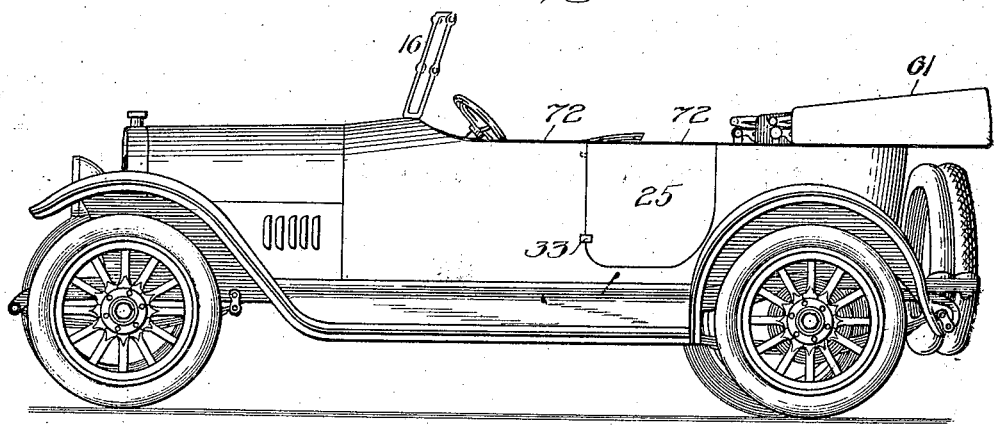

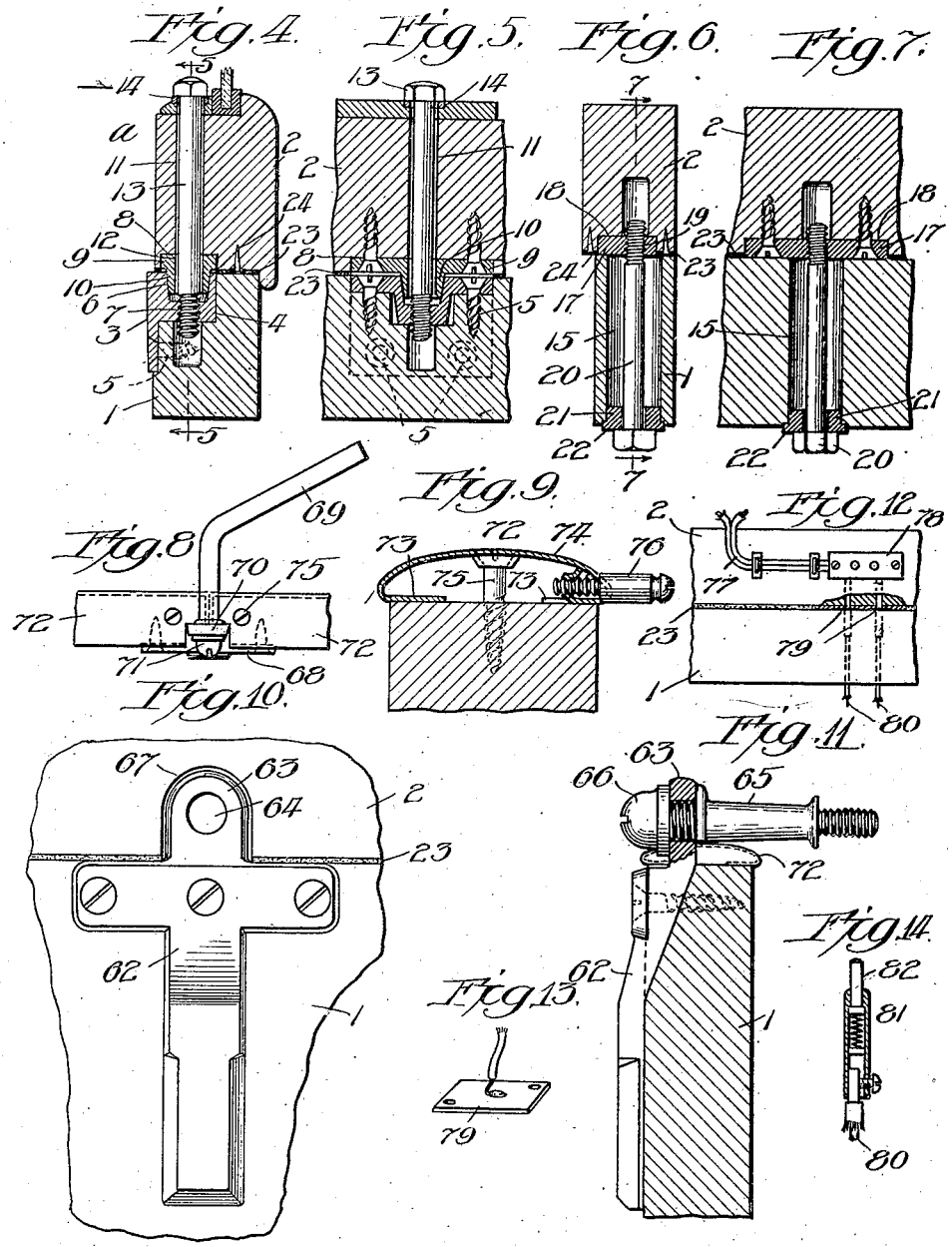

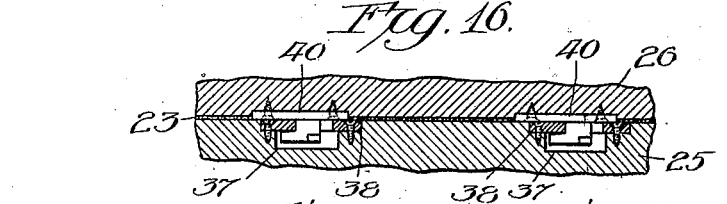
W. L. KISSEL AND J. F. WERNER.
CONVERTIBLE AUTOMOBILE BODY.
APPLICATION FILED JULY 21, 1917.
1,438,382.
Patented Dec. 12, 1922.
3 SHEETS—SHEET 3.
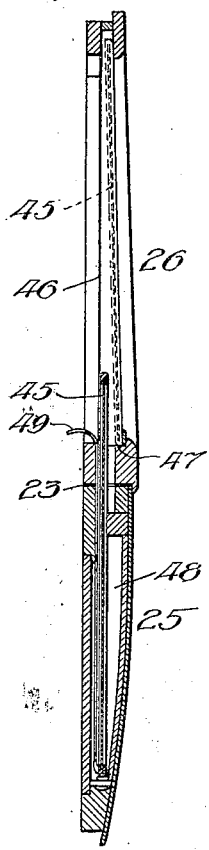

1,438,382

UNITED STATES PATENT OFFICE.

WILLIAM L. KISSEL AND JOHN FREDERICK WERNER, OF HARTFORD, WISCONSIN, ASSIGNORS TO KISSEL MOTOR CAR COMPANY, OF HARTFORD, WISCONSIN, A CORPORATION OF WISCONSIN.

CONVERTIBLE AUTOMOBILE BODY.

Application filed July 21, 1917. Serial No. 182,027.

*To all whom it may concern:*

Be it known that we, WILLIAM L. KISSEL and JOHN FREDERICK WERNER, citizens of the United States, residing at Hartford, in the county of Washington and State of Wisconsin, have invented certain new and useful Improvements in Convertible Automobile Bodies, of which the following is a specification.

The object of this invention is to provide an automobile body which shall be readily convertible from open to closed condition and vice versa, without the sacrifice of elegance, rigidity or strength.

This object has been attained by providing a body consisting of a lower section corresponding to the usual touring, roadster or runabout body, and a top section, said sections being detachably but rigidly united by simple concealed fastenings. The top section includes an upper door-section which is detachably connected to a lower door-section forming part of the lower body section. The top section also comprises a built-in wind-shield which takes the place of a detachable wind-shield furnished for summer use.

Fastenings are provided on the lower body-section for the convenient attachment of a folding top, said top being readily detachable when the top body section is to be set in place, and said fastenings being invisible when the top body section is in use. Other features of construction contributing to neatness, comfort and ease of operation will be hereinafter mentioned.

In the accompanying drawings, Figure 1 is a perspective view of an automobile embodying the features of our invention, the top section being shown in place. Fig. 2 is a perspective view of the car, the top section having been removed and the folding top and summer wind-shield substituted. Fig. 3 is a diagrammatic plan view of the lower body section. Fig. 4 is a sectional view illustrating one of the several fastenings employed to connect the top section to the lower body section. Fig. 5 is a section on dotted line 5—5 of Fig. 4. Fig. 6 is a sectional view illustrating a special fastening employed in securing the forward portion of the top section to the lower body section. Fig. 7 is a section on dotted line 7—7 of Fig. 6. Fig. 8 is a plan view showing a bow-rest bracket secured to the lower body section. Fig. 9 is a sectional view showing a molding used to cover the upper edge of the lower body section when the top section is not in use. Fig. 10 is a fragmental inside view illustrating a bracket for the attachment of the summer folding top, the top body section being shown in place in this view. Fig. 11 is a sectional view of said bracket showing the pivot for the folding top, the top body section having been removed. Fig. 12 is a fragmental inside view showing the means for establishing electrical connection between the wiring carried by the two body sections. Fig. 13 is a perspective view of one of the electrical contacts. Fig. 14 is a sectional view of one of the cooperating contacts. Fig. 15 is a vertical transverse sectional view of one of the doors. Fig. 16 is a vertical sectional view illustrating the devices for uniting the upper and lower door-sections. Figs. 17, 18 and 19 are detail views of the devices for uniting the upper and lower door-sections. Fig. 20 is a fragmental inner side view of the door illustrating the door lock. Figs. 21, 22 and 23 are detail views of one form of hinge employed for the door. Fig. 24 is a detail view of the lowermost hinge of the door. Figs. 25 and 26 are views illustrating the lock for the upper door-section.

We have selected a car of the sedan type to illustrate the invention, although it will be understood that the invention may be embodied in motor carriage bodies of many other types. The body comprises a lower section 1 and a top section 2 having at their upper and lower edges respectively, rails extending longitudinally around the sections and adapted to fit together edge to edge with the outer surfaces of the upright walls of the sections lying substantially flush. The lower section, which may be of any preferred conformation, forms a touring car body when the top section is removed. The top section 2 is secured in place by fastenings of suitable character, as, for example, the fastening $a$ shown in Figs. 4 and 5. Said fastening comprises a metallic block 3 secured in a recess 4 in the inner side of the upper rail of the lower body section 1, said block being fixed in place by means of a suitable number of screws 5. The block 3 has in its upper side a downwardly-tapering socket 6 and a screw-threaded opening 7 axially alined with said socket. Within a recess 8 in the lower edge of the top section 2 is secured a plate 9 having a tapering dowel 10 adapted to fit in the socket 6. A vertical hole 11 is formed through the lower rail of the top section 2, said hole being continued in an aperture 12 extending through the dowel 10. A cap-screw 13 having a washer 14 underneath its head is inserted into the holes 11 and 12 and screwed into the opening 7, said screw serving to force the dowel 10 into wedging engagement with the socket 6. The lower outer edge of the top section 2 has a depending lip which, when the dowels are drawn into the sockets in the manner described, is urged tightly into sealing engagement with the lower section 1 at its upper outer edge to serve as a weather-proofing while it, at the same time, resembles an ornamental bead extending continuously around the body covering the joint between the sections.

The number and relative location of the fastenings a vary with the size and form of the body. In the present instance, they are located as indicated in Fig. 3.

In securing the front end of the top section 2 to the lower body section 1, we may avail ourselves of the holes 15 provided in the lower body section to receive the ordinary fastenings of the summer wind-shield 16. A plate 17 is secured within a recess 18 in the lower edge of the top section 2, said plate having a threaded opening 19 to receive a screw 20 inserted upwardly through the opening 15. Inasmuch as the opening 15 is of considerably larger diameter than the screw, there is inserted in the lower end of said opening a bushing 21 having a flange 22 that underlies the rail or frame member in which the hole 15 is formed.

Any suitable means may be employed to insure against squeaking. Herein there is interposed between the lower body section 1 and the top section 2 a strip 23 of suitable material, as, for example, textile material coated or saturated with a suitable substance having lubricating properties. Said strip is secured to the lower edge of the body section 2 by suitable means, as, for example, tacks 24. The screws 13 and 20 hold the non-squeak strip 23 in close contact with the upper edge of the lower body section. These strips supplement in a measure the depending lip on the body section 2 in providing a weather-proof construction.

The body may be provided with any suitable number and arrangement of doors and windows. The car selected to illustrate the invention is provided with one door at each side of the body, said door comprising a lower section 25 and an upper section 26. Any suitable type of hinges may be employed to support the door. In the present instance the upper door-section is mounted on hinges 27 such as the one illustrated in Figs. 21, 22 and 23. Said hinge comprises a pocket 28 mounted in a recess in the door frame, said pocket being secured in place by means of screws passing through lugs 29 on the pocket. Hinged within the pocket at 30 is a member 31 adapted to be secured to the door by means of screws passing through holes 32. When the door is closed the hinge is invisible. Owing to the curvature of the lower portion of the body, it is necessary to use a different type of hinge for the lower end of the door in order that the pivots of all of the hinges shall be in alinement. Herein is shown a hinge 33 comprising two leaves 34 connected to the door frame and the lower door section by means of screws passing through the screw holes 35, said leaves being connected by means of a removable pin 36. The leaves 10 are of such length that the pin 36 is in alinement with the pivots 30 of the hinges 27.

Any suitable means may be employed for detachably uniting the door-sections 25 and 26. Herein we have shown the upper edge of the lower door-section as provided with recesses 37 above which are secured plates 38 each having a key-hole slot 39. To the lower edge of the upper door-section are secured plates 40 each having a downwardly-extending projection 41. Each projection consists of a shank 42 having a head 43. The head 43 is adapted to pass through the key-hole slot 39 and lie within the recess 37. The head comprises a lug 44 adapted to underlie the plate 38 when the head is moved toward the narrow end of the slot 39. The upper surface of the lug 44 is slightly inclined so as to cause the two sections of the door to be drawn tightly together with a wedging action when the door-sections are moved with relation to each other in the direction to force the lug 44 beneath the plate 38. A strip of non-squeak material 23 is attached to the lower edge of the upper door-section, said strip being drawn into close contact with the upper edge of the lower door-section through the wedging action of the lug 44.

The door is preferably provided with a sash 45 (Fig. 15). In the side members of the upper door-section are formed ways 46 to contain the vertical edges of the sash. Said sash is adapted to stand upon a ledge 47 on the upper door-section. In the lower door-section is a pocket 48 into which the sash may be lowered. 49 is a strap secured to the lower end of the sash for moving the sash off the ledge 47 and for raising and lowering the sash.

Any preferred means may be employed to lock the door. In Fig. 20 is shown a lock 50 of common construction carried by the lower door-section and provided with an operating handle 51. The bolt 52 of said lock has a cam surface 53 thereon against which rests the lower end of a rod 54. This rod extends through a guide 55 on the casing of the lock and through a groove 56 in the upper door section. The upper end of said rod is attached to a slide 57 (Fig. 25) carried by the upper door-section, said slide having a projection 58 adapted to lie at one side of a keeper 59 secured to the door frame. The adjacent ends of the projection 58 and the keeper 59 are rounded at one side to cause the projection 58 to be forced upwardly as the door is closed. As soon as the projection 58 has passed the keeper a coiled spring 60 moves the slide 57 downwardly to place the projection 58 behind the keeper 59, as shown in Figs. 25 and 26.

Means is provided on the lower body section 1 for the attachment thereto of a folding top 61 (Fig. 2). This means comprises a bracket 62 (Figs. 10 and 11) permanently secured to the lower body section 1 upon the inner side thereof. Said bracket comprises a lug 63 projecting above the lower body section, said lug having an opening 64 to receive a stud 65 for the attachment of the bows of the folding top. The stud 65 is secured in place by means of a nut 66. When the top body section 2 is to be mounted upon the lower body section the stud 65 is removed. The top body section 2 has a recess 67 to contain the lug 63.

Brackets 68 (Fig. 8) which may be identical in construction with the brackets 62 are provided to support the brackets 69 on which the bow-rests (not shown) are mounted. The brackets 69 are detachably secured to the lugs 70 of the brackets 68 by means of nuts 71.

In order to give the upper edge of the lower body-section 1 a finished appearance when the top body section 2 is removed, we provide a molding 72 (Fig. 9) of suitable character, said molding being applied to the entire upper edge of the lower body section, including the door sections 25. The molding is made in sections of convenient length. The molding herein shown is formed of sheet-metal and comprises two flanges 73 (Fig. 9) adapted to rest upon the upper edge of the lower body section and a rounded portion 74. The molding may be secured in place in any suitable manner, as, for example, by means of screws 75, the heads of which lie in countersunk openings in the molding.

Any suitable fasteners may be employed for the attachment of the curtains and the rollable portions of the folding top. We have herein shown a known form of fastening stud 76 (Figs. 3 and 9), said studs being screwed into the molding 72. It will be seen that when the molding is removed preparatory to installing the top section 2, the studs 76 also are removed so that there are no summer top fasteners on the car when the winter top 2 is in use.

If desired, the top body section 2 may be equipped with one or more electric lamps. In Fig. 12 we have shown at 77 a part of the wiring for such lamps, 78 being a switch. The wires 77 are provided with terminals in the form of plates 79 such as shown in Fig. 13, these terminals being fixed upon the lower edge of the top body section 2. The wires 80 carried by the lower body section 1 have terminals 81 (Fig. 14) each comprising a spring-pressed contact 82 located at the upper edge of the lower body section and adapted to bear against a contact plate 79 on the top section. Thus it will be seen that when the top body section is secured in place, electrical connection is automatically established between the wiring systems of the two body sections.

In Fig. 1, 83 denotes a built-in-wind-shield which closes the front end of the top section 2.

Assuming that the top body section 2 is in place, as illustrated in Fig. 1, and it is desired to convert the car into an open touring car, the operation is as follows: The screws that secure the hinge members 28 (Fig. 21) to the top 2 are removed and the hinge pin 36 is withdrawn. The door may now be lifted out of place. The upper door-section is then slid with relation to the lower door-section (toward the right, as viewed in Fig. 20) until the lugs 44 are out from under the plates 38. This may be done without bending the rod 54, as the groove 56 in which said rod extends is wide enough to allow for the requisite relative movement between the door-sections. The door-sections may then be separated, the heads 43 moving out through the key-hole slots 39. The lower door-section may now be mounted upon the body, or, if desired, this may be done after the top section 2 has been removed. The screws 13 and 20 and the bushings 22 are then withdrawn, when the top section 2 may be lifted off the car. The summer wind-shield 16 may then be secured in place, the studs 65 secured to the lugs 63, the bow-rest brackets 69 attached to the lugs 70, the folding top 61 connected to the studs 65, and the molding 72 attached to the upper edge of the lower body section, including the door section 25.

The car is prepared for winter use by a reversal of the order of operations just described.

The interior of the body sections may be lined with leather or any other desired material to enhance the appearance of the car and to conceal the screws 13 and the brackets 62 and 68, flaps being provided in the lining to give access to said screws 13.

It will be seen that the construction herein disclosed produces convertibility without affecting the beauty, rigidity, noiselessness and convenience of the car, and that there are no exposed fastenings or unsightly structural features at the joining line.

We claim as our invention:

1. An automobile body comprising a lower or main section having at its upper edge an inside rail extending longitudinally around the body, an upper or top section having its lower outer edge defined by a slight depending lip and having at its lower inner edge a rail adapted to abut throughout its length against the first-mentioned rail with the outer surfaces of the upright walls of the sections disposed substantially flush with respect to each other with the lip covering the joint between the sections on the outside, said rails having between them interfitting dowel parts adapted to prevent relative lateral movement between the sections but permitting a lifting of the upper section bodily upwardly from off the lower section, and fastening means for rigidly securing said abutting rails together by clamping the upper rail securely upon the lower rail so as to prevent a separation thereof vertically, such clamping being arranged to cause forcing together of said interfitting dowel parts and thereby a tight sealing engagement of said lip on said upper section against the outside of said lower section, said fastening means including bolts or the like occupying upright positions between the inner and outer side faces of said abutting rails whereby the upper section may be firmly secured to the lower section with the bolts or the like concealed from view.

2. An automobile having a lower body section, a top section, means for detachably securing said sections together, a door comprising a section hinged to the lower body section and a section hinged to the top section, a projection on one door section, a plate on the other door section having an elongated opening to receive said projection, the projection having a lug adapted to underlie the plate at one end of said opening and having a wedging engagement therewith to tightly secure the door sections together.

3. An automobile having, in combination, a body comprising a lower section and a top section arranged to fit together edge to edge and each having a hinged door section, devices for detachably securing said body sections together, and means detachably securing said door sections together including interfitting elements on the abutting edges of said sections adapted to be drawn together or released by a movement of one section laterally relative to the other a short distance, said sections being normally held against relative lateral movement by their hinged connections to the body sections.

4. An automobile having, in combination, a body comprising a lower section and a top section arranged to fit together edge to edge and each having a hinged door section, devices for detachably securing the sections and their doors together, the devices for securing the door sections being held against detachment by their hinge connections with the body sections.

5. In an automobile body, the combination of a lower section and a top section, said lower section comprising a wooden rail member upon the inner side at the upper edge thereof, a metallic plate member embedded in and secured to the upper edge of said rail member so as to be flush therewith, said plate having a tapering depressed central portion with an aperture therein and constituting a dowel socket, said top section comprising a second wooden rail member upon the inner side at the lower edge thereof having its outer lower edge defined by a slight depending lip, a second metallic plate member embedded in and secured to the under side and at the inner edge of said second rail member, said second plate member having a central depending tapering dowel or stud portion centrally apertured and adapted to engage with a wedging fit in the socket in the first plate member to cause a drawing in of said lip into tight weatherproofing engagement with the outside of said lower section, said second rail member having a vertical aperture therethrough, and a bolt or the like extending through said aperture and engaging in the aperture in said socket whereby to clamp the two rail members and thereby the upper and lower sections of the body together with the joint therebetween defined but covered and sealed on the outside by said lip.

6. An automobile having a body consisting of a lower section and a top section, opposed electric wire terminals on the adjacent portions of said sections, the terminals on the upper sections being yieldable pins and the terminals on the lower sections being stationary plates, and means for securing said sections together with the pins abutting the plates, whereby to automatically establish electrical connection between the lower and the upper sections.

In testimony whereof we have hereunto set our hands.

WILLIAM L. KISSEL.
JOHN FREDERICK WERNER.